United States Patent [19]
Finley

[11] 3,917,985
[45] Nov. 4, 1975

[54] TRANSFORMER/TRANSMISSION LINE INTERCONNECT SYSTEM

[75] Inventor: Keith W. Finley, Rome, Ga.

[73] Assignee: General Electric Company

[22] Filed: Oct. 31, 1974

[21] Appl. No.: 519,503

[52] U.S. Cl. .................... 317/103; 174/18; 248/58; 248/58;63
[51] Int. Cl.² ...................... H02B 5/04; H02B 1/18
[58] Field of Search ............ 174/18, 38; 307/17, 42; 317/103

[56] References Cited
UNITED STATES PATENTS

| | | | |
|---|---|---|---|
| 1,706,140 | 3/1929 | Brand .............................. | 174/18 X |
| 2,047,000 | 7/1936 | Calvert ............................ | 174/18 X |
| 2,390,192 | 12/1945 | St. Clair .......................... | 248/63 |
| 3,431,539 | 3/1969 | Majewski ...................... | 174/18 UX |
| 3,488,563 | 1/1970 | Caruthers et al. .............. | 307/17 X |

FOREIGN PATENTS OR APPLICATIONS
645,242   10/1950   United Kingdom.................. 174/18

Primary Examiner—Laramie E. Askin
Attorney, Agent, or Firm—John J. Kelleher

[57]  ABSTRACT

A multi-purpose junction box and a flexible, easily removable high voltage underground type cable are used to connect a high voltage underground transmission line terminating in a pothead, to a power transformer. The pothead terminating high voltage underground transmission line terminates in a multi-purpose junction box with the central conductor of said transmission line being connected to electrical connecting means internal of the junction box. The flexible cable, in turn, connects the power transformer to the electrical connecting means internal of the multipurpose junction box.

4 Claims, 5 Drawing Figures

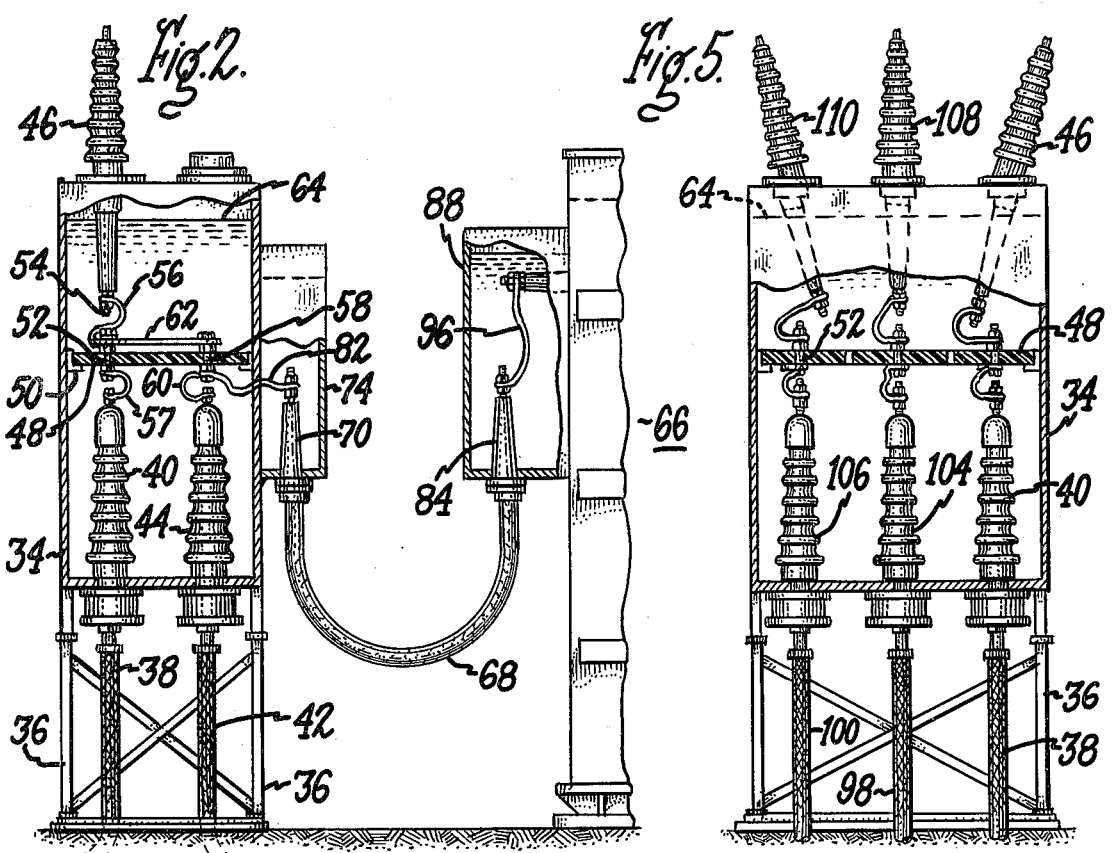
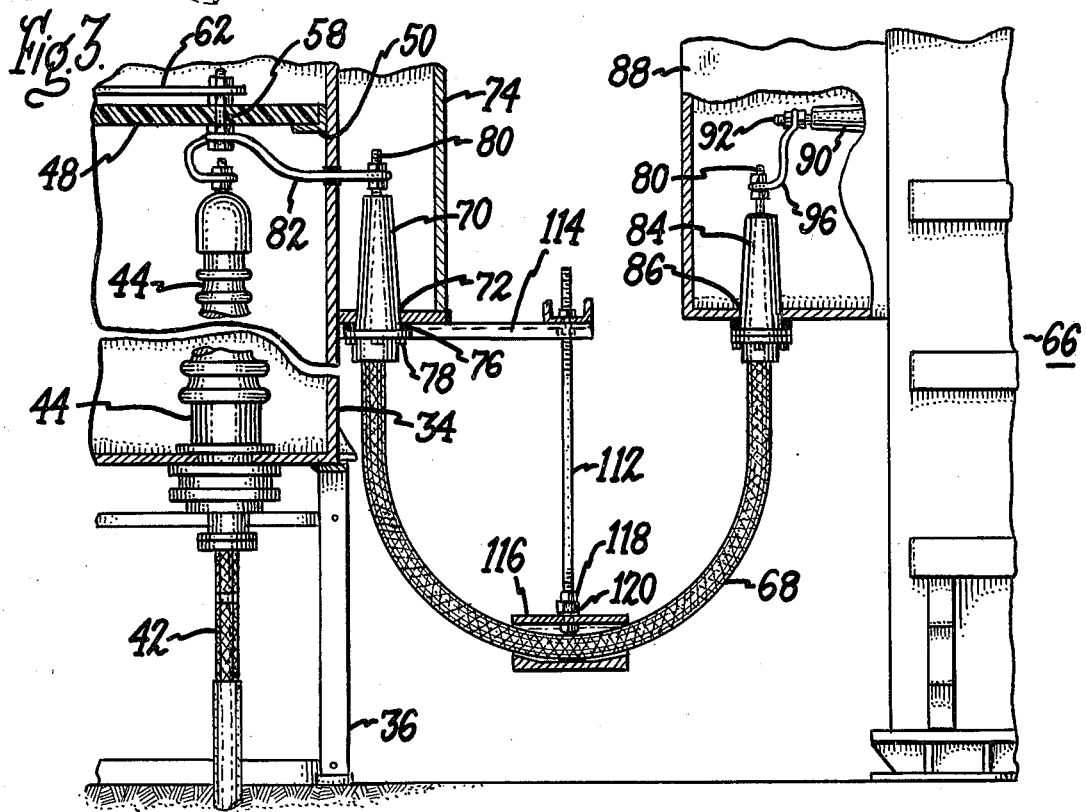

TRANSFORMER/TRANSMISSION LINE INTERCONNECT SYSTEM

BACKGROUND OF THE INVENTION

The present invention relates generally to high voltage transmission lines and particularly to a system for flexibly interconnecting a high voltage transmission line of the underground type, terminating in a pothead, to a fixedly mounted power transformer.

High voltage transmission lines are normally used to carry power generated at a remote site, over long distances, to the general vicinity of the ultimate use point. High voltage transmission lines may be thought of as falling into either one of two categories. The first category, and by far the most prevelant, is the overhead transmission line. Overhead transmission lines are merely bare wires strung between vertical support towers; being attached to the towers by electrical insulators which are capable of withstanding the difference in potential between the transmission line and the support tower. The second or remaining category is the high voltage underground transmission line. An underground transmission line has a central conductor which is surrounded by a dielectric or electrically nonconducting material. Surrounding this dielectric material is a metallic shield-like covering whose function is to maintain the outer surface of the dielectric material at a fixed potential with respect to the central conductor of the underground transmission line in order to establish a fixed voltage drop across said dielectric material. If a fixed voltage drop is not so established, a relatively rapid deterioration of the dielectric material will occur, resulting in its electrical failure or breakdown.

As a consequence of having a voltage controlling shieldlike covering incorporated in an underground transmission line, provision must be made to prevent the voltage, to which the central conductor of said underground transmission line is subjected, from arcing over onto said voltage controlling shield, when terminating the transmission line. The standard method for terminating such a transmission line is by means of a potential head or pothead. The function of a pothead is to adequately separate the aforementioned shielding from the aforementioned central conductor of an underground transmission line and provide the necessary additional insulation required to retard dielectric deterioration in the region where the underground transmission line is terminated by the pothead.

A pothead and underground transmission line combination is normally a very rigid assembly. When it became necessary to remove and reinstall a power transformer to which the underground transmission line is connected previous methods included, among other things, the careful vertical lifting of the power transformer. This careful vertical lifting was an attempt to avoid dielectric material damaging lateral movement of the pothead terminating underground transmission line which very often resulted when the power transformer came in contact with the pothead/underground transmission line combination during such removal. Lateral movement of this type is even more damaging where the underground transmission line is of the gas-filled type. Damage to a gas-filled underground type transmission line will cause loss of the aforementioned gas and the insulating benefits resulting therefrom.

In other power transformer installations it is very often desirable to locate switchgear immediately adjacent a power transformer which is, in turn, connected to an underground transmission line having a pothead termination. However, in such installations it would almost always be necessary to move the power transformer laterally from the switchgear for ease of removal, due to the fact that the switchgear in such installations is normally several orders of magnitude larger and/or heavier than the power transformer. Lateral movement of a transformer in such situations usually results in some movement of the pothead terminated underground transmission line. Such movement very often results in damage to the pothead terminated underground transmission line.

In installations where the power transformer is fed from an underground transmission line of the type described herein, electrical failures sometimes occur in the underground transmission line or the power transformer to which it is connected, causing power to be interrupted for a considerable period of time. Supplying power to the load that is connected to the transmission line and power transformer while repairs are being effected, is very often a difficult and time consuming task.

In order to avoid these and other disadvantages it would be desirable to provide a transmission line to power transformer interconnect system that would readily permit the removal and installation of a power transformer without subjecting the underground transmission line to possible lateral movement during transformer removal, would permit unobstructed lateral movement of a power transformer mounted immediately adjacent switchgear, would permit another source of power to be supplied to the power transformer if the underground transmission line supplying the power transformer should fail and would permit a power transformer to be readily substituted for a failed power transformer while the failed transformer is being repaired.

Accordingly, the principal object of the present invention is to provide a transmission line to power transformer interconnect system that will avoid the possibility of lateral movement of a pothead terminated underground transmission line that supplies power to a power transformer when said power transformer is removed for replacement of repair.

Another object of the present invention is to provide a transmisson line to power transformer interconnect system that will readily permit the lateral movement of a power transformer mounted immediately adjacent switchgear of the type that is physically large and/or heavy with respect to said power transformer.

Still another object of the present invention is to provide a transmission line to power transformer interconnect system that will readily permit the substitution of an alternate source of power for that being supplied by an underground transmission line, if an electrical failure should occur in the underground transmission line.

A further object of the present invention is to provide a transmission line to power transformer interconnect system that will facilitate the temporary substitution of another transformer for a failed transformer while the failed transformer is either being repaired or replaced.

SUMMARY OF THE INVENTION

An underground transmission line terminating in a pothead is normally a rigid assembly making the removal and subsequent installation of a power transformer to which it is connected extremely difficult, if damage to the underground transmission line and pothead combination is to be avoided. The present invention terminates the pothead terminating underground transmission line in a multi-purpose junction box. The central conductor of the underground transmission line is connected to electrical connecting means internal of the multi-purpose junction box. A power transformer is then connected to the underground transmission line by means of a flexible underground type cable, terminating in a pothead-type connector called a terminator. The flexible underground type cable is demountably connected between a power transformer electrical bushing and the electrical connecting means internal of the multi-purpose junction box.

The multi-purpose junction box is, in addition, capable of receiving power from an alternate source and tansmitting same to a power transformer to which it is connected, if the underground transmission line supplying power to the multi-purpose junction box should fail. The multi-purpose junction box is also capable of temporarily supplying power to another transformer if the power transformer supplied through the multi-purpose junction box needs to be removed for replacement or repair.

The invention, which is sought to be protected, will be particularly pointed out and distinctiy claimed in the claims appended hereto. However, it is believed that this invention and the manner in which its objects and advantages are obtained, as well as other objects and advantages thereof, will be more readily understood by reference to the following detailed description of the preferred embodiment thereof, particularly when considered in light of the accompanying drawings.

BRIEF DESCRIPTION OF THE DRAWINGS

FIG. 2 is a side elevation, partially in section, showing an underground transmission line electrically connected to a power transformer by the electrical connecting means of the present invention.

FIG. 3 is an enlarged side elevation of a portion of FIG. 2, showing the junction box and flexible underground type cable of the present invention interconnected to a power transformer.

FIG. 5 is a left side elevation, partially in section, of the electrical multi-purpose junction box of the present invention showing pothead to roof bushing interconnections.

DESCRIPTION OF THE PRIOR ART

Figure 1:
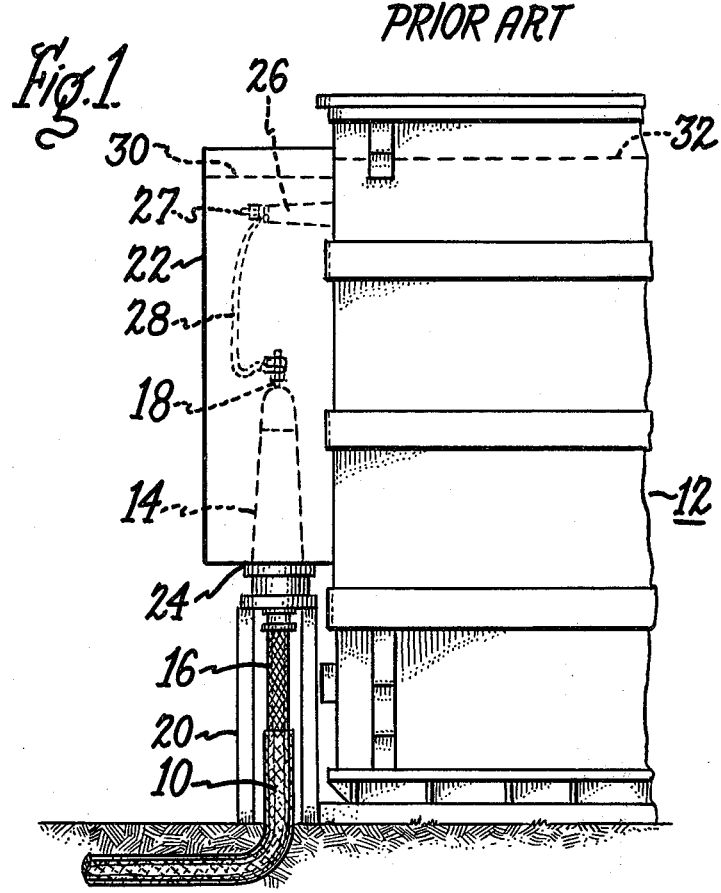
FIG. 1 is a side elevation, partially in section, of prior art apparatus for connecting an underground type transmission line to a power transformer.

Referring now to the drawings wherein like numerals are used to indicate like parts throughout, in FIG. 1 a side elevation, partially in section, of prior art apparatus for interconnecting underground transmission line 10 to a power transformer 12 is depicted. Underground transmission line 10 terminates in potential head or pothead 14. Pothead 14 provides the electrical insulation required between the potential controlling shield 16 of underground transmission line 10 and the central conductor 18 of said underground transmission line 10. The pothead 14/underground transmission line 10 assembly is supported by support structure 20 making the combination of underground transmission line 10, pothead 14 and support structure 20 a rigid assembly. Transformer connection box 22 having aperture 24 through which pothead 14 is inserted, has a fluid seal closing the space between said transformer connection box 22 and pothead 14. An electrical bushing 26 with its central conductor 27 provides the means for electrically connecting to windings internal of transformer 12. Electrical conductor 28 provides the electrical connection between the central conductor 18 of underground transmission line 10 and central conductor 27 of electrical bushing 26. Transformer connection box 22 is filled with transformer oil 30 to the point where pothead 14 and electrical bushing 26 are completely immersed in said transformer oil 30 leaving space in connection box for thermal expansion of said transformer oil 30. The level of transformer oil 30 in transformer connection box 22 may or may not be at the same level of transformer oil 32 internal of transformer 12. When transformer 12 is removed for replacement or repair, transformer oil 30 is drained, electrical conductor 28 is removed and then transformed 12 is carefully lifted off pothead 14 and its associated underground transmission line 10, assuming that all of the other fastening devices for holding transformer 12 fixedly in place have been removed. Significant lateral movement of transformer 12, while it is being removed, which causes lateral movement of pothead 14 and its associated underground transmission line 10, will very often result in electical failure causing damage to the electrical insulation of pothead 14 or underground transmission line 10 or both. An installation of this type is very prone to damage and requires an excessive amount of time-consuming care in order to avoid the just-mentioned type of damage.

DESCRIPTION OF THE PREFERRED EMBODIMENT

Turning now to the present invention and specifically to FIG. 2 where a side elevation, partially in section, of an underground transmission line electrically connected to a power transformer by the electrical connecting means of the present invention, is depicted. Multipurpose junction box 34 is shown supported by support legs 36. Underground transmission line 38, which in this preferred embodiment supplies power to junction box 34, terminates in pothead 40 as in FIG. 1 herein, and is used for the same reason mentioned above with respect to pothead 14 which terminates underground transmission line 10 in said FIG. 1. In FIG. 2, underground transmission line 42 terminating in pothead 44, carries electrical power delivered to junction box 34, to another use site. Roof bushing 46 mounted at the top of an extending through junction box 34 facilitates the transfer of electrical power into or out of said junction box 34. An important function of roof bushing 46 is to facilitate the transfer of power into junction box 34 from an overhead transmission line (not shown) should underground transmission line 38 fail. Tap board 48 internal of junction box 34 is attached to junction box 34 by means that include angle supports 50. Tap board 48 is constructed of relatively nonconducting material and a number of electrically conducting studs extend vertically through and are fixedly attached to tap board 48. These just mentioned studs provide the electrical connecting and support means for connecting the central conductor of underground transmission lines 38 and 42 and roof bushing 46 to each other and eventually to the appropriate power transformer connection with which it is associated. It is to be noted that the equipment shown and described in FIG. 2 and in this preferred embodiment, is but one phase of a polyphase transmission line to power transformer interconnect system. Tap board 48 mounted stud 52 is connected to central conductor 54 of roof bushing 46 by flexible electrical conductor 56. The central conductor of underground transmission line 38 is connected to stud 52 by flexible electrical conductor 57. The central conductor of underground transmission line 42 is electrically connected to tap board 48 mounted stud 58 by flexible electrical conductor 60. Solid electrical conductor 62 connects stud 52 to stud 58. In this preferred embodiment junction box 34 is filled with transformer oil 64 to the point where potheads 40 and 44, and tap board 48 are fully immersed in transformer oil 64 and roof bushing 46 is partially immersed in said transformer oil 64, leaving the proper amount of volume above transformer oil 64 for thermal expansion of said transformer oil 64. An electrical connection is then made from stud 58 to power transformer 66 by flexible underground type cable 68 and other electrical connecting means. The description of underground type cable 68 and how it electrically connects stud 58 to transformer 66 will best be understood by referring to FIG. 3.

Referring now to FIG. 3 where each end of flexible underground type cable 68 is shown terminating in a pothead termination called a terminator. Terminator 70 of flexible underground type cable 68, having a solid dielectric material surrounding its central conductor, is inserted into opening 72 in connection box 74 which is appended to the side of junction box 34. When terminator 70 is fully inserted into opening 72, a flange portion of said terminator 70 engages fluid sealing circular gasket 76 inserted between the flange portion of terminator 70 and connection box 74. Terminator 70 and circular gasket 76 are held in a fixed position with respect to connection box 74 by bolts 78. The details of how terminator 70 is attached to connection box 74 are more clearly shown in FIG. 4. With continued reference to FIG. 3, the central conductor 80 of flexible cable 68 is connected to stud 58 by means of flexible electrical conductor 82. Terminator 84 on the power transformer 66 end of flexible cable 68 is inserted into aperture 86 on transformer connection box 88, said transformer connection box 88 being physically attached to transformer 66. Terminator 84 of flexible cable 68 is connected to connection box 88 of transformer 66 in the same manner that terminator 70 of flexible cable 68 is connected to connection box 74 of multi-purpose junction box 34. Bushing 90 located internal of transformer connection box 88 has its central conductor 92 electrically connected to the appropriate windings internal of transformer 66 (not shown). Central conductor 92 of bushing 90 is electrically connected to central conductor 80 of flexible cable 68 by means of flexible electrical conductor 96. Transformer connection box 88 is filled with transformer oil to the point where both bushing 90 and terminator 84 together with flexible connecting link 96 are completely immersed in oil with space left above the transformer oil for thermal expansion.

Flexible underground type cable 68 and the similar flexible underground type cables in the remaining two phases, are additionally supported by support means that are attached to and depend from connection box 74 on multi-purpose junction box 34; said support means being illustrated in FIG. 3. Rod 112 threaded on each end is fastened at its upper end to plate 114, said plate 114 being welded to and extending horizontally outward from connection box 74. Rod 112 is inserted through an aperture in said plate 114 and a pair of nuts threaded onto rod 112 fixedly attach the upper end of said rod 112 to plate 114. A cylindrical collar 116 having an inside wall contoured to the bend radius of flexible cable 68 and through which flexible cable 68 has been inserted, has a threaded boss portion 120 extended upwardly from a side thereof into which rod 112 has been threaded. When nut 118 on rod 112 is tightened against boss 120 on collar 116, said collar 116 is held in a fixed position such that the longitudinal axis of said collar 116 is maintained in a generally horizontal position.

Figure 4:
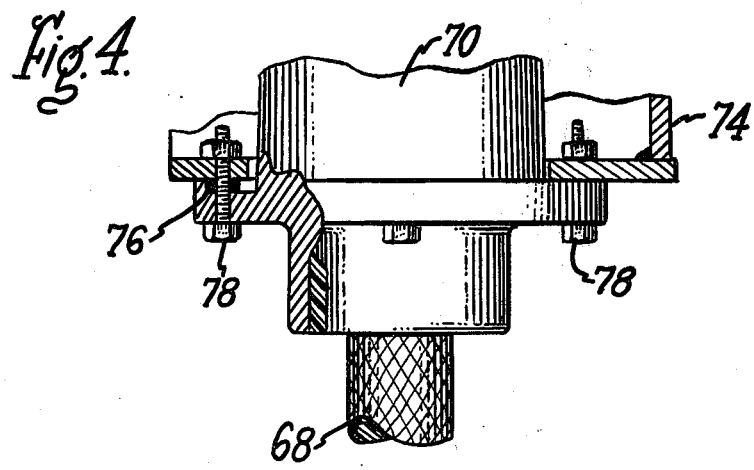
FIG. 4 is an enlarged detail, partially in section, showing the mounting details of a terminator end of the flexible underground type cable of the present invention.

As previously stated, FIGS. 2 and 3 and the descriptions relating thereto have depicted and described only one phase of a polyphase transmission line to power transformer interconnect system. This preferred embodiment is normally used in a three phase system, a portion of which is depicted in FIG. 5. Referring now to FIG. 5 which is a left side elevation of junction box 34 of FIG. 2, wherein underground transmission lines 38, 98 and 100, terminating in potheads 40, 104 and 106, are electrically connected to roof bushings 46, 108 and 110 respectively. Each pothead terminating underground transmission line and its associated roof bushing are associated with a single phase of a three phase interconnect system and with a flexible underground type cable. The aforementioned description of the single phase of the three phase interconnect system depicted in FIGS. 2, 3 and 4 is equally applicable to the interconnect equipment associated with underground transmission lines 98 and 100, in FIG. 5.

DISCUSSION

By referring to the preferred embodiment and description contained herein it is manifest that power transformer 66 can readily be removed for replacement or repair with little, if any, change of an underground transmission line and pothead combination being damaged by the removal of said power transformer 66. When underground type flexible cable 68 and the corresponding flexible cables for the remaining phases are removed prior to removing transformer 66, an underground transmission line and pothead combination is sufficiently displaced from power transformer 66 and is sufficiently projected by junction box 34 and its support legs 36, to all but remove the possibility of damage to such an underground transmission line and its associated pothead.

In addition to the fact that the power supplied to multi-purpose junction box 34 can be sent to another use point by an additional pothead terminating underground transmission line connected to said junction box 34, roof bushings 46, 108 and 110 make it possible to have junction box 34 supplied by an overhead transmission line if the need arises or make it possible to take power from junction box 34 to supply another transformer temporarily if, for example, power transformer 66 had to be replaced or repaired.

In the description of the preferred embodiment and elsewhere herein, the term "underground type" means a high voltage electrical transmission line or cable having at least three essential characteristics. The first essential characteristic is that the central power carrying conductor is covered with an insulating or dielectric substance or combination of dielectric substances. Some representative examples of these dielectric substances are solid dielectric (such as cross-linked polyethylene insulation) gas filled, oil filled, and paper insulated with a lead cover. In the case of flexible underground type cable 68 in the preferred embodiment, a solid dielectric is utilized as the dielectric substance. Solid dielectric is considerably more flexible than a gas-filled type of dielectric which is the main reason for its use in flexible underground type cable 68 of the preferred embodiment. The second essential characteristic is that it contain a shield-like device for establishing a relatively fixed voltage drop across the dielectric material. By controlling this particular voltage drop, the deterioration of the electrical insulating characteristics of the dielectric material, that might otherwise result from significant voltage variations across the dielectric material, is minimized. The third essential characteristic is that the ends of such a cable terminate in a pothead; the definition of a pothead and the reasons for utilizing such a device having hereinbefore been explained.

The terms "pothead" and "terminator" used herein are equivalent. Two terms were used instead of one to avoid confusing the termination of an underground transmission line which has herein been designated a pothead with the termination of an underground type flexible cable of the present invention which has herein been designated a terminator.

In the preferred embodiment, junction box 34, connection box 74 attached to junction box 34, and transformer connection box 88 have been described as having transformer oil contained in each. It is to be understood that it is within the scope of the present invention to substitute other insulating liquids or insulating gases, including air, in the appropriate voltage environment, for the transformer oil of the preferred embodiment.

I claim:

1. An improved electrical connecting means connecting a high voltage underground type power transmission line having a central conductor and terminating in a pothead, said high voltage transmission line and pothead combination having a high degree of rigidity, to an electrical bushing of a fixedly mounted power transformer, wherein the improvement comprises:

a. a junction box mounted in a fixed position, said junction box having,
   an aperture receiving therethrough the pothead end of said pothead terminating underground type transmission line;
b. electrical connecting means mounted internal of said junction box to which the central conductor of said underground type power transmission line is electrically connected; and
c. a flexible cable of the underground transmission line type, having a central conductor,
   the ends of said flexible cable each terminating in a terminator,
   one of said flexible cable terminator ends being demountably attached to said power transformer, the central conductor of said flexible cable being electrically connected to said power transformer bushing, another of said flexible cable terminator ends being demountably attached to said electrical junction box,
   the central conductor of said flexible cable being electrically connected to said internal connecting means of said electrical junction box.

2. Apparatus as defined in claim 1 wherein said electrical connecting means comprises:
a. an insulating member fixedly attached to and internal of said junction box;
b. at least one electrically conducting stud member mounted to said fixedly mounted insulating member;
c. a first electrical conductor connecting the central conductor of said high voltage underground transmission line to said electrically conducting stud member; and
d. a second electrical conductor connecting said stud member to the central conductor of said flexible cable of the underground transmission line type.

3. Apparatus as defined in claim 1 wherein said junction box further comprises:
a. an electrical bushing attached to and extending through a wall of said junction box, having the central conductor of said electrical bushing connected to said electrical connecting means internal of said junction box.

4. Apparatus as defined in claim 3 wherein said junction box contains an insulating fluid.

* * * * *